United States Patent Office 3,409,591
Patented Nov. 5, 1968

3,409,591
EPOXY-CONTAINING CONDENSATES, THEIR PREPARATION AND USE
Alton J. Landua, Maplewood, and James R. Todd, North Plainfield, N.J., assignors to Shell Oil Company, New York, N.Y., a corporation of Delaware
No Drawing. Filed Dec. 27, 1966, Ser. No. 604,646
20 Claims. (Cl. 260—47)

This invention relates to epoxy-containing condensates and to their preparation. More particularly, the invention relates to new solid acetone-soluble epoxy-containing condensates prepared from polyepoxides and poly-functional amines, and to their use, particularly in the preparation of laminates, powder coatings, molding compositions and the like.

Specifically, the invention provides new and particularly useful solid acetone-soluble epoxy-containing condensates having ability to form superior heat-resistant laminated products, which products are condensates of (1) a polyepoxide possessing more than one vic-epoxy group, and preferably a glycidyl polyether of a polyhydric phenol, and (2) a polyfunctional amine possessing more than two active hydrogen attached to amino nitrogen, such as, for example, methylene dianiline, said condensates having a softening point of at least 50° C. and a WPE of at least 300.

The invention further provides a process for preparing the above-noted condensates which comprises mixing and reacting the polyepoxide with the polyfunctional amine in controlled proportions at a temperature between about room temperature and 260° C. and preferably in the presence of a catalyst, such as salicylic acid.

The invention further provides cured insoluble infusible products having superior heat resistance which products are obtained by heating and reacting the above-noted adducts with epoxy resin curing agents, and preferably dicyandiamide.

Polyepoxides, such as commercially available glycidyl ethers of polyhydric phenols, have been used with considerable success in the past in the preparation of laminates, adhesives, powdered coatings and the like. Their use in these applications, however, has been limited in the past months because of the trend toward more heat resistant products and faster curing systems. The laminates prepared from these resins, for example, fail to retain a great part of their strength at the elevated temperatures of 225–250° F. In addition, the systems fail to cure at elevated temperatures in a matter of a few minutes which shortened time is required for many new assembly line coating applications.

It is an object of the invention, therefore, to provide a new class of epoxy resins and a method for their preparation. It is a further object to provide new epoxy-containing condensates that can be used to form products having outstanding heat resistance. It is a further object to provide new epoxy-containing condensates that can be cured in a few minutes at elevated temperatures. It is a further object to provide new highly reactive condensates of polyepoxides and amines that can be used to produce superior laminated products. It is a further object to produce resins for low temperature curing surface coatings. It is a further object to provide new epoxy-containing condensates that can be used to produce improved powdered coating compositions and the like. It is a further object to provide new epoxy-containing condensates that can be used to produce improved molding powder compositions. These and other objects of the invention will be apparent from the following detailed description thereof.

It has now been discovered that these and other objects may be accomplished by the new products of the invention comprising acetone-soluble solid condensates of (1) a polyepoxide possessing more than one vic-epoxy group, and preferably a glycidyl polyether of a polyhydric phenol, and (2) a polyfunctional amine possessing more than two active hydrogen attached to amino nitrogen, such as, for example, methylene dianiline, said condensates having a softening point of at least 50° C. and a WPE of at least 300. It has been found that these new condensates represent a new series of epoxy resins which provides a new and unexpected combination of properties making the resins ideally suited for many important applications not heretofore touched by the known epoxy resins. These new condensates, for example, can be easily cured with agents, such as dicyandiamide, to produce products having outstanding heat resistance and retention of strength at elevated temperatures. In addition, the products can be cured in a matter of minutes when heated to elevated temperatures with certain curing agents. The new products are thus ideally suited for use in making high temperature laminates, rapid curing powder coating composition, molding compositions and the like. The new products are also ideally suited for use in preparing surface coatings which cure at low temperatures. The superior properties of the new products are illustrated in the working examples at the end of the specification.

The new condensates of the invention are prepared by mixing and reacting a polyepoxide with a polyfunctional amine in controlled proportions. The polyepoxide that can be used in the process comprise those organic materials which have more than one vic-epoxy group, i.e., more than one

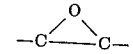

group, which group may be in a terminal position, i.e., a

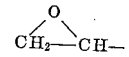

group or in an internal position, i.e., a

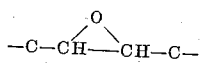

The polyepoxides may be saturated or unsaturated, aliphatic, cycloaliphatic, aromatic or heterocyclic and may be substituted with substituents, such as chlorine, hydroxyl group, ether radicals, and the like.

Examples of such polyepoxides include, among others 1,4-bis(2,3 - epoxypropoxy)benzene, 1,3-bis(2,3 - epoxypropoxy)benzene, 4,4'-bis(2,3 - epoxypropoxy)diphenyl ether, 1,8 - bis(2,3-epoxypropoxy)octane, 1,4 - bis(2,3-epoxypropoxy)cyclohexane, 4,4' - bis(2 - hydroxy - 3,4'-epoxybutoxy)diphenyl dimethylmethane, 1,3 - bis(4,5-epoxypetnoxy) - 5 - chlorobenzene, 1,4 - bis(3,4-epoxybutoxy) - 2-chlorocyclohexane, 1,3 - bis(2-hydroxy-3,4-epoxybutoxy)benzene, 1,4 - bis(2 - hydroxy - 4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2-bis-(4-hydroxyphenol)butane, 4,4' - dihydroxybenzophenone, bis(4-hydroxyphenyl)ethane, 2,2-bis(4 - hydroxyphenyl)pentane and 1,5-dihydroxynaphthalene. The halogen-containing epoxides may be further exemplified by 3-chloro-2,3-chloro-1,2 - epoxybutane, 3-bromo-1,2 - epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for seven hours to effect the reaction and the product is then washed free of salt and base.

The preparation of four suitable glycidyl polyethers of dihydric phenols is illustrated in U.S. 2,633,458 and are designated Polyethers A, B, C and D.

Another group of polyepoxides comprises the polyepoxy polyethers obtained by reacting, preferably in the presence of an acid-acting compound, such as hydrofluoric acid, or of the aforedescribed halogen-containing epoxides, such as epichlorohydrin, with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, insoitol, trimethylolpropane, bis(4-hydroxycyclohexyl)-dimethylmethane and the like.

The preparation of suitable polyepoxide polyether is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 30 and 1,000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups, include among others, the epoxidized esters of polyethylenically unsaturated monocarboxylic acids, such as epoxidized linseed, soybean, perilla, oiticica, tung, walnut, and dehydrated castor oil, methyl linoleate, butyl linoleate, ethyl 9,12-octadecadienoate, butyl 9,12,15-octadecatrienoate, ethyl eleostearate, octyl 9,12 - octadecadienoate, methyl eleostearate, monoglycerides of tung oil fatty acids, monoglycerides of soybean oil, sunflower, rapeseed, hempseed, sardine, cottonsed oil, and the like.

Another group of the epoxy-containing materials having internal epoxy groups include the epoxidized esters of unsaturated alcohols having the ethylenic group in an internal position and polycarboxylic acids, such as, for example, di(2,3 - epoxybutyl)adipate, di(2,3-epoxybutyl)ocalate, di(2,3 - epoxyhexyl)succinate, di(2,3-epoxyoctyl) tetrahydrophthalate, di(4,5-epoxydodecyl)maleate, di(2,3-epoxybutyl)terephthalate, di(2,3-epoxypentyl)thiodipropionate, di(2,3 - epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate and di(2,3 - epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 2,3-epoxycyclohexylmethyl 2,3 - epoxycyclohexanoate, and 3,4 - epoxycyclohexyl 4,5-epoxyoctanoate and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13 - diepoxyeicosanedioate, dibutyl 7,8,11,12-diepoxyoctadecanedioate, dioctyl 10,11 - diethyl - 8,9,12,13-diepoxyeicosanedioate, dicyclohexyl 3,4,5,6-diepoxycyclohexane-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons such as epoxidized 2,3-bis(cyclohexenyl)propane, 2,2-bis(cyclohexenyl)butane, 8,10-octadecadiene and the like.

Polyepoxides having an epoxy equivalent weight between 400 and 4,000 are preferred. Polyepoxides having an average molecular weight between 400 to 1,000 are particularly preferred.

The other component to be used in making the special condensates is a polyfunctional amine possessing more than two hydrogen attached to amino nitrogen. The amino nitrogen are preferably attached to aromatic ring or rings. Examples of the amines includes, among others, methylene dianiline, meta-phenylene diamine, hexamethylene diamine, 1,2,5-triaminobenzene, 4,4'-diaminophenylsulfone, 4,4'-diaminophenylpropane, 4,4'-diaminodiphenylethane, and the like, and mixture thereof. Particularly preferred amines to be used include the aromatic primary polyamines preferably aromatic diamines possessing amino nitrogen attached to aromatic rings, 4 amino hydrogen and containing from 6 to 24 carbon atoms.

A portion of the above-noted polyfunctional amine can be replaced with less functional amines, such as those possessing 2 or less amino hydrogen. Examples of these include, among others, aniline meta-aminophenol, cyclohexylamine, cyclopentylamine, allyl amine, octlylamine, 2-amino-4-methoxybenzene, 2-amino-4-chlorobenzene and the like, and mixture thereof. Preferred members of this group include the primary aliphatic, cycloaliphatic and aromatic monoamines containing up to 24 carbon atoms. In general, up to 70% of the polyfunctional amine can be replaced by these less functional amines, but preferably from .5% to 40% of the polyfunctional amine is so replaced with the less functional amines.

The condensates are prepared by combining one or more of the above-described polyepoxides with one or more of the above-noted amines preferably in the presence of a catalyst. Preferred catalysts include the acid catalysts or acid acting catalysts. For aromatic amines the acids may be any inorganic or organic acid having an acidity ($K_a$ value) of at least $10^{-3}$ to $10^{-6}$. Examples of these acid catalysts include, among others, salicylic acid, thioglycolic, monochloroacetic acid, benzoic, acetic, resorcinol, etc. When aliphatic or cycloaliphatic amines are employed, the catalysts employed may be weaker acidic materials. The amount of the catalyst employed will vary over a wide range. In general, amounts vary from about .1% to about 5% by weight of the reactants and more preferably from .5% to 4% by weight.

Water can also be utilized as a co-catalyst in the range of .1% to 5% by weight.

In order to obtain the desired adducts instead of gelled resinous masses which are useless for the present purpose, it is necessary that an important detail be observed, namely, that a proper proportion of a reactant be used. The equivalent excess of the polyepoxide should vary from about .33 to .033 equivalents. By chemical equivalent amount as used herein is meant that amount needed to furnish one epoxide group for every amino hydrogen. Also the amount of polyepoxide and amine used should be such that the total over-all average functionality of reactants should be between 2 and 2.5. This over-all functionality can be determined by the following equation:

$$\frac{\frac{(X)(WX)}{(MX)} + \frac{Y(WY)}{(MY)} + \cdots *}{\text{Total number of moles per 100 grams of reactants}} = 2 \text{ to } 2.5$$

$X$ = number of epoxy groups per mole of the polyepoxide.
$MX$ = molecular weight of the polyepoxide.
$WX$ = weight percent of total reactants of polyepoxide.
$Y$ = number of amine hydrogen atoms on amine molecule.
$MY$ = molecular weight of the amine.
$WY$ = weight percent of total reactants of amine.

The temperature employed in the formation of the adducts may vary from about 20° C. to 250° C. and more preferably from 20° C. to 150° C. It is generally preferred to initiate the condensation at a low temperature, e.g., ambient to 110° C. and allow it to exotherm to a temperature of 150° C. to 250° C. Cooling may be applied as needed. The period at the higher temperature should be as short as possible, e.g., 1 to 20 minutes, in order to avoid danger runaway reaction. The use of the acidic catalysts as noted above, permits one to use lower initiating temperatures. The reaction is preferably effected under atmospheric pressure although superatmospheric or subatmospheric pressure may be utilized as desired.

Solvents or diluents may be employed in the reaction if desired, but in most cases one or more of the reactants will be liquid and the mixing can be effected without the use of solvents. Suitable solvents if needed, include xylene, benzene, cyclohexane, dioxane, diethyl ether and the like.

The condensate may be recovered from the reaction mixture by any suitable means. If solvents or diluents are employed, they may be removed by evaporation, distillation, and the like. In the absence of such solvents or diluents, the adduct are generally recovered and used as the crude reaction product.

The condensates prepared by the process of the invention will be solid products having a softening point of at least 50° C., and more preferably 75° C. to 140° C. These softening points are determined by the Hercules method. The adducts will also have a WPE value of at least 300 and preferably 300 to 3,000. WPE is weight in grams of the condensate needed to supply 1 epoxy group. It is determined by a silver nitrate-HCl method. According to this method, the condensate is added to a solution of HCl in tetrahydrofuran wherein the epoxy groups react with

*(If more than one amine or polyepoxide is used, the equation should be continued with the same information about that reactant).

the HCl. The solution is then back titrated with silver nitrate to deermine unreacted HCl. A sample without the condensate is also titrated with $AgNO_3$. The calculation is determined by the formula:

$$\frac{\left(\begin{array}{c}\text{milliliters of } AgNO_3 \\ \text{for reagent sample}\end{array}\right) - \left(\begin{array}{c}\text{milliliters of } AgNO_3 \\ \text{used for sample containing condensate}\end{array}\right)\left(\begin{array}{c}\text{Normality} \\ \text{of } AgNO_3\end{array}\right)}{\text{Weight of Condensate Sample}}$$

$= X$ (milliequivalents of epoxy) per gram sample $$\frac{1(100)}{(X)(100)} = WPE$$

or $$\frac{1000}{(X)} = WPE$$

If all other conditions being equal, the lower the WPE the more reactive the adduct. Adducts having WPE over 625 are generally preferred when highly flexible products are desired.

The epoxy-containing adducts prepared by the novel process of the invention are highly reactive and can also be cured with epoxy resin curing agents to form hard insoluble infusible products. Curing agents that can be utilized include, among others, amines, amino-containing polymers, polybasic acids, acid anhydrides, salts, mercaptans, hydrazines, $BF_3$ gas, $BF_3$-complexes, and the like, and mixtures thereof. Specific examples of such materials include, among others, p-phenylene diamine, diaminophenyl-sulfone, p,p'-methylene dianiline, p,p'-diaminophenyl-methane, triaminobenzene, 2,4-diaminotoluene, tetraaminobenzene, 3,3'-diamino diphenyl, 1,3-diamino-4-isopropylbenzene, 1,3-diamino-4,5-diethylbenzene, diaminostilbene, triethylamine, ethylene diamine, diethylamine, diethylene triamine, triethylene tetramine, tetraehylene pentamine, pyridine, diaminopyridine, piperidine, N,N'-diethyl-1,3-propane diamine, dicyandiamide, melamine, fatty acid salts of amines, such as the 2-ethylhexoate of tris(dimethylaminomethyl)phenol adducts of polyepoxides such as those described hereinafter, and the above-described mono- and polyamines, as the adduct of p-phenylene diamine and styrene oxide, the adduct of p-phenylene diamine and allyl glycidyl ether, the adduct of diglycidyl ether of 2,2-bis(4-hydroxyphenyl)propane and diethylene triamine, the adducts of diethylene triamine and ethylene oxide, the adduct of diethylene triamine and styrene oxide, the adducts of polyamines and unsaturated nitriles, such as the adducts of polyamines and unsaturated nitriles, such as the adduct of diethylene triamine and acrylonitrile, the adduct of diethylene triamine and unsaturated sulfolanes, and the adduct of p-phenylene diamine and acrylonitrile.

Other examples include the amino-containing polyamides as described in U.S. Patent No. 2,450,940 and the monomeric amides described in U.S. Patent No. 2,832,799.

Other examples include the acid anhydrides, such as phthalic anhydride, succinic anhydride, dodecenylsuccinic anhydride, maleic anhydride, tetrahydrophthalic anhydride, pyromellitic anhydride, hexachlorophthalic anhydride, methyl Nadic anhydride, anhydrides obtained by reacting maleic anhydride with unsaturated compounds, such as oils, terpinene, long chain unsaturated acids and the like as well as anhydrides obtained by reacting long chain acids with acetic anhydride and the like.

Still other examples include the salts, such as magnesium perchlorate, zinc fluoborate, potassium persulfate, copper fluoborate, cupric arsenate, zinc persulfate, cupric fluosilicate, cupric iodate, cupric sulfate, magnesium phosphate, stannic fluoborate, zinc nitrate, and the like; as well as the chloride derivatives as aluminum chloride, zinc chloride, ferric chloride and the like.

Still other examples include $BF_3$ gas and the $BF_3$ adducts with various materials, such as amines, amides, ethers, phenols and the like.

A preferred group of catalysts include 3-amino pyridine and the imidazole compounds and their salt derivative, such as, for example, 2-methyl-4-ethyl imidazole, benzimidazole, imidazole lactate, imidazole acetate and the like.

As the condensates can be cured by heat alone, the amount of the curing agents employed will vary over a wide range depending on cure cycle desired, properties desired and economics. The amount of the curing agents having active hydrogen as well as the agents such as acid anhydrides are preferably employed so as to furnish at least .6 equivalent, and still more preferably, .8 to 1.5 equivalents per equivalent of the polyepoxide. As used herein in relation to the amount of curing agent, "equivalent" means that amount needed to furnish 1 active hydrogen or anhydride group per epoxy group. The other curing agents, such as metal salts, tertiary amines, $BF_3$, and the like are preferably used in amounts varying from about .1% to 6% by weight of the material being cured.

The new epoxy-containing adducts can be utilized for a great many different applications, such as in preparation of moldings, castings, pottings, coatings and impregnating compositions, laminates, filament winding operations, and the like.

The solid adducts are particularly suitable for use in the preparation of powdered compositions, for use in molding operations or in fluidized bed systems.

The heat-curable powdered epoxy resin compositions are preferably obtained by effecting a special type of dry blending of the above-noted adduct with the curing agent, such as the heterocyclic amines. The blending is accomplished by utilizing the agglomeration principle as noted hereinafter. The proportion of the adduct and the curing agent used in making the composition may vary within certain limits. In general, it is preferred to utilize from .05 to 6 parts of the curing agent per 100 parts of the adduct. Preferred amounts varying from .1 part to 5 parts of the curing agent per 100 parts of the adduct.

When used in the dry blending process, it is preferred that the adduct be preground so that the particles have a size less than 500 microns.

In this blending, the components are added, in any order, to the pebble mill which already contains the grinding media charge. After charging, the pebble mill is run for a sufficient time to assure proper particle agglomeration and film flow. The time period required for agglomeration is dependent on (1) the size of the pebble mill used, (2) the rotational speed of the mill and (3) the volume ratio of media to formulation components. The time period in the mill required for the proper film flow to be developed is very much dependent on the type of grinding media used (i.e., size, shape and media density). In general, the volume ratio of grinding media to total mill volume can be varied considerable depending upon the above-noted factors; such a ratio is usually between about 25% and 75% with about 50% being an especially good ratio. Upon termination of the grinding period, the powder is discharged and without further treatment is ready for use.

A feature of the above process is the utilization of high density grinding media. The high density grinding media may be spherical or cylindrical in shape with cylindrical media being preferred. The spherical media may range from about ¼ inch in diameter to 2 or more inches in diameter with a preferred diameter of from about ½ to 1½ inches in diameter. In general, the cylindrical media may range from about ½ inch in diameter to 2 or more inches in diameter with the preferred diameter being in the range of from ¾ inch to 1½ inches in diameter. The ratio of height to diameter of the cylinders may range from about 0.5:1 to about 3:1 with a 1:1 ratio being preferred. The term "high density" as used herein means a density which is at least 25% greater than porcelain and preferably at least 40% greater than porcelain. The density of the grinding media may be expressed in terms of specific gravity based on water as 1.0. Thus, the term "high density" as used herein means that the grinding media has a specific gravity of at least 2.75 and preferably greater than 3.5. The grinding media may be metallic, semi-metallic or non-metallic. In general, non-metallic media is preferred although grinding media such as steel, may be used in applications where metallic contamination is not a limiting consideration.

The volume ratio of media to formulation components may vary through a wide range with a ratio of from about 1:1 to about 5:1 being usually employed. Very good results are obtained when the weight ratio of media to components is from about 1:1 to about 10:1 with a ratio of about 5:1 to 10:1 being preferred.

As noted hereinbefore, the time required to assure proper agglomeration and film flow is dependent on many factors. Under the precise conditions the pulverized composition is ready for use after about 6 hours. It is generally preferred to screen the product to pass 100% through an 80 or 100 mesh screen.

While the adduct may be added to the pebble mill in flake or lump form, i.e., without pregrinding, it is generally preferred to pregrind the adduct to approximately 20 mesh.

It will be appreciated that the present one-step process utilizing a pebble mill and high density media not only provides a simple process for pulverizing the ingredients into a fine powder but also forms an agglomerate of the particles of adduct and curing agent so that they do not separate on standing.

The compositions will appear as finely divided powder and have a particle size varying from less than 1 micron to 175 microns. They can be connected to hard insoluble products by heating at 300° F.

The heat-curable epoxy resin compositions of the present invention may be utilized for a great many applications. They may be used, for example, as molding compositions and can be pressed, extruded or otherwise utilized in the formation of molded plastic articles. In these applications, curing temperatures ranging from about 250° F. to 350° F. are generally preferred. Pressures may vary from about 100 p.s.i. to 1,000 p.s.i.

The new compositions may also be utilized as powdered adhesives or bonding agents to adhere various surfaces, such as metal, wood, ceramics, plaster, cement and the like together. In these applications the powdered composition is placed alone or in combination with liquid adhesive materials between the desired surfaces to be bonded and heat and pressure applied as noted above.

The compositions are particularly suited for use in the formation of coatings as by spraying, dipping, etc. onto heated articles and then subjecting the coated product to post cure conditions. The compositions are particularly suited for use in fluidized bed systems for coatings. In this application, addition materials, such as fillers, thixotropic agents, pigments, accelerators, etc., are added to the composition and the resulting mixture utilized in the fluidized bed.

Suitable fillers which may be employed as desired includes, among others, aluminum powder, mica, bentonites, clays, synthetic resins and polymers, rubbers, ignited $Al_2O_3$, short-fiber asbestos, wood flour, carbon black, silica, zinc dust, talc and the like. A large number of fillers are available commercially in particle sizes from about 0.1 microns upward.

The quantity of fillers used is dependent upon many factors such as, cost, particle size, particle shape, absorption characteristics and loading volume. The lightweight fillers such as asbestos and uncompressed mica are employed in ratios below 50 phr. (parts per one hundred parts of polyepoxide) and generally below 35 phr.; the medium weight fillers, such as talc and powdered aluminum, may be employed up to about 100 phr., and the heavier fillers may be employed up to about 150 phrs. In general, however, in order to optimize raw material costs without minimizing coating properties, the ratio of filler to polyepoxide ranges from about 10 to about 60 phr.

It is generally desirable, although not necessary, to employ a thixotropic agent to prevent dripping or sagging at high film build. Any of the thixotropic agents normally used in the art are suitable for use in the present compositions, including silica aerogels, bentonite clays and their derivatives, castor oil derivatives and the like.

Solutions of the new adducts in solvents such as hydrocarbons, ketones, ethers and the like may also be used for a great many different applications. They may be used, for example, as adhesives and bonding materials for a variety of different surfaces, such as metal, wood, ceramics, cement, plaster, and the like. In these applications, the solution composition is placed alone or in combination with other liquid adhesive materials between the desired surfaces to be adhered together and pressure and heat then applied to effect the cure. Preferred temperatures range from about 250° F. to about 450° F.

Because of their ability to be cured quickly at moderate temperatures, the solution compositions are particularly suited for use in the preparation of coating and impregnating compositions. In this application, the compositions are sprayed, brushed, dipped or otherwise applied to the desired surface and the coating then heated by suitable means to a curing temperature of preferably 250° F. to 450° F. for a few minutes. Such a procedure may be used to coat various types of surfaces, such as metal surface, wood, cement, roadways, walkways, and the like. As noted above, the resulting films are outstanding in their resilience, solvent resistance and resistance to steam.

The systems described above are also very useful in the preparation of electrical pottings and castings. They are particularly suitable for preparing very large castings as can be cured at moderate temperatures without liberation of large amounts of heat and this gives a more even cure which results in much stronger and more durable products. In this application, the composition can be injection molded or poured or otherwise added to the desired mold or casting and then heated to effect cure. As the new compositions can be cured at moderate temperatures, they may be used for encapsulation of electrical equipment which is heat sensitive.

The solution compositions are particularly useful for filament winding applications. In the application the filaments such as, for example, glass fibers are passed into and through the liquid composition of the invention and then wound onto the desired mandrel or form and the formed unit allowed to cure by application of heat. The great advantage of the new compositions in this application is the fact that the composition can be cured at moderate temperatures and their use would thus not effect heat sensitive material. For example, the rubber lining of missile cases are heat sensitive and would be affected by use of high temperatures for curing material thereon. The new compositions thus could be used for the filament winding of these cases where the winding is directly on the liner.

The above-described systems are also useful in the preparation of laminates. In this application, the sheets of fibrous material are first impregnated with the composition of the invention. The sheets of fibrous material are impregnated with the mixture by spreading it thereon or by dipping or otherwise immersing in the impregnant. The solvent is conveniently removed by evaporation and the mixture is cured to the fusible resin state. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos, mica flakes, cotton bats, duck muslin, canvas, synthetic fibers such as nylon, Dacron and the like. It is usually preferred to utilize woven glass cloth that has been given prior treatment with the well known finishing or sizing agents, therefore, such as chrome methacrylate or vinyl trichlorosilane.

To illustrate the manner in which the present invention may be carried out, the following examples are given. The examples are given only to illustrate the invention and are not to be regarded as limiting the scope of the invention in any way. Unless otherwise indicated, parts and percentages disclosed in the examples are by weight. The polyether referred to by letter, such as Polyether A, are those disclosed in U.S. 2,633,458. Percent w. as used herein refers to percent by weight.

EXAMPLE I

This example illustrates the preparation of a highly reactive solid adduct from Polyether A (glycidyl polyether of 2,2-bis(4-hydroxyphenyl)-propane, methylene dianiline and aniline.

89.7 parts of Polyether A was combined with 5.3 parts of aniline and 5.0 parts of methylene dianiline. The mixture was heated to an initiation temperature of 120° C. over a period of 35 minutes. The mixture was then allowed to exotherm to 185° C. over a period of 20 minutes. The mixture was held at 185° C. for 42–48 minutes and then poured out and cooled to room temperature. The resulting solid product had a softening point of 83° C. and a WPE of 417.

The above product was used to prepare a laminating varnish containing dicyandiamide as curing agent according to the following formulation:

| Component: | Parts by wt. |
|---|---|
| Above-noted condensate | 100 |
| Dimethyl ketone | 43 |
| Methyl Cellosolve | 36 |
| Dicyandiamide | 4 |
| Benzyldimethylamine | 0.2 |

The above-noted components were combined by stirring. The resulting varnish had good storage stability and exhibited no significant viscosity increase even after six days at ambient temperature.

The above-noted varnish was brush applied in a low relative humidity (less than 25% relative humidity), to Volan A glass cloth. The coated cloth was then placed in a 150° C. oven for advancement and then cut to form 8″ x 10″ 8-ply parallel lay-ups in this same low humidity area. The lay-ups were then given 2 minutes contact pressure in a 350° F. press followed by 10–25 minutes at 200 p.s.i. and 350° F. The laminates were then cooled to 150° F. under pressure before removal from the press, on 8 to 9 minutes.

The laminates were then tested for physical properties and the results shown in the table below in comparison to a similar laminated product prepared from a straight glycidyl polyether of 2,2-bis(4-hydroxyphenyl)propane and dicyandiamide. Properties of similar laminates prepared under ambient humidity are shown in Table No. II.

TABLE I.—LAMINATE CONDITIONS AND PROPERTIES—LOW HUMIDITY (<25%)

| Resin | Prepreg. Advancement at 150° C., min. | Prepreg., percent Resin | Flow,[1] percent weight | Laminate, percent Resin | Press Time at 350° F. min. | Flexural Strength, p.s.i. RT | Flexural Strength, p.s.i. 225° F. | Retention, percent | Peel Strength, 1 oz. Cu, lb./in. Before Solder Dip | Peel Strength, 1 oz. Cu, lb./in. After 1 min., 500° F. Solder Dip |
|---|---|---|---|---|---|---|---|---|---|---|
| Precondensate Resin | 3 | 38.2 | 2.8 | 36.5 | 25 | 78,000 | 54,000 | 69.2 | 15.2 | 12.9 |
| Glycidyl ether of 2,2-bis(4-hydroxyphenyl)-propane | 6 | 39.1 | 1.1 | 38.4 | 25 | 79,000 | 37,600 | 47.6 | 13.3 | 12.0 |

[1] [(Wt. of prepreg.−wt. of trimmed laminate)×100]/(wt. of prepreg.)=percent flow.

TABLE II.—LAMINATE CONDITIONS AND PROPERTIES—AMBIENT HUMIDITY (45–55%)

| Resin | Prepreg. Advancement at 150° C., min. | Prepreg., percent Resin | Flow, percent weight | Laminate, percent Resin | Press Time at 350° F., min. | Flexural Strength,[1] p.s.i. RT | Flexural Strength,[1] p.s.i. 225° F. | Retention, percent | Solder Dip,[2] 500° F. for 1 min.,[1] days at 50% RH and 72° F. before testing | Solder Dip,[2] 500° F. for 1 min.,[1] days at 50% RH and 72° F. before testing |
|---|---|---|---|---|---|---|---|---|---|---|
|  |  |  |  |  |  |  |  |  | 23 | 30 |
| Precondensate Resin | 4 | 44.1 | 6.1 | 40.5 | 25 | 75,600 | 47,000 | 62.2 | Pass | Pass |
| Glycidyl ether of 2,2-bis(4-hydroxyphenyl)-propane | 7 | 45.4 | 9.3 | 39.8 | 25 | 81,500 | 23,400 | 28.8 | Pass | Fail |

[1] Parallel to warp.   [2] To pass, there must be no delamination or blistering and very little discoloration.

EXAMPLE II

This example illustrates the preparation of another adduct from Polyether A, methylene dianiline and aniline.

85.0 parts of Polyether A was combined with 11.3 parts of aniline and 3.7 parts of methylene dianiline. The mixture was heated to an initiation temperature of 107° C. over a period of 19 minutes and then the mixture exothermed to a temperature of 240° C. over a 19 minute period. The mixture was held at that temperature for 2 minutes, and then dumped and cooled to room temperature. The resulting product had a WPE of 790 and a softening point of 116–121° C. This product was easily cured by heating with 5% by weight of imidazole at 150° C. to form a hard insoluble infusible resin.

EXAMPLE III

This example illustrates the preparation of an adduct from Polyether A, a mixture of aniline and methylene dianiline and salicylic acid.

85.30 parts of Polyether A, 13.06 parts of aniline, 1.14 parts of methylene dianiline were mixed together and to this mixture was added 0.5 part of salicylic acid. This mixture was heated to 50° C. over a period of 15 minutes. The mixture was then allowed to exotherm to 167° C. over a period of 35 minutes. The mixture was held at 167° C. for 7 minutes and then dumped and cooled to room temperature. The product was a solid resin having a softening point of 95–105° C. and a WPE of 708.

The above product was easily cured by heating with 4% imidazole at 150° C. The resulting product was a hard insoluble infusible casting.

EXAMPLE IV

This example illustrates the preparation of another adduct from Polyether A a mixture of aniline and methylene dianiline and salicylic acid.

86.2 parts of Polyether A was combined with 9.8 parts of aniline and 3.5 parts of methylene dianiline. To this mixture was added .5 part of salicylic acid. This mixture was heated to 52° C. over a period of 8 minutes. The mixture was then allowed to exotherm to 184° C. The mixture was held at that temperature for 3 minutes and then the product was dumped and cooled to room temperature. The resulting product was a solid resin having a WPE of 640 and a softening point of 96–105° C.

The above product was easily cured by heating with 3% imidazole at 150° C. The resulting product was a hard insoluble infusible casting.

EXAMPLE V

Adducts of Polyether A and a mixture of aniline and methylene dianiline were prepared as shown in Example IV. The proportions and results are shown in the table below:

POLYETHER A—ANILINE MDA[1]

| | | |
|---|---|---|
| Polyether A | percent w | 86.1 |
| Aniline | do | 9.9 |
| MDA | do | 3.5 |
| Salicylic acid | do | 0.5 |
| WPE | | 620 |
| Hercules S.P. | °C | 96–103 |

[1] MDA=methylene dianiline.

EXAMPLE VI

This example illustrates the preparation of an adduct of Polyether A, meta-phenylene diamine and aniline.

91.8 parts of Polyether A was combined with 2.8 parts of meta-phenylene diamine and 5.4 parts of aniline. The mixture was heated to 116° C. over a period of 18 minutes and then allowed to exotherm to 189° C. over a period of 36 minutes. The product was then cooled to room temperature. The resulting product was a solid acetone-soluble resin having a WPE of 412 and a melting point of 79° C.

The above product was easily cured by heating with 3% imidazole at 150° C. The resulting product was a hard insoluble resin.

EXAMPLE VII

Adducts of Polyether A and a mixture of aniline and meta-phenylene diamine were prepared by the method shown in Example VI. The proportions and results are shown in the table below:

POLYETHER A-ANILINE-META-PHENYLENE DIAMINE

| Percent Weight | | | | WPE | Hercules S.P., °C |
|---|---|---|---|---|---|
| Polyether A | Aniline | Meta-Phenylene Diamine | Salicylic Acid | | |
| 87.4 | 10.1 | 2.0 | 0.5 | 631 | 99–104 |
| 87.6 | 9.9 | 2.0 | 0.5 | 645 | 97–105 |

EXAMPLE VIII

This example illustrates the preparation of an adduct of Polyether A, hexamethylene diamine and aniline.

85.8 parts of Polyether A was combined with 0.7 part of hexamethylene diamine and 13.5 parts of aniline. The mixture was heated to 110° C. over a period of 21 minutes. The product was then cooled to room temperature. The resulting product was a solid acetone-soluble resin having a WPE of 731 and a softening point of 94–101° C.

The above product was easily cured by heating with 3% imidazole at 150° C. The resulting product was a hard insoluble infusible resin.

EXAMPLE IX

Example VIII was repeated with the exception that the amounts of reactants were changed as indicated in the table. The resulting products and properties are shown in the table.

| Percent Weight | | | WPE | Hercules S.P., °C. |
|---|---|---|---|---|
| Polyether A | Aniline | Hexamethylene Diamine | | |
| 87.4 | 10.5 | 2.1 | 632 | 94–105 |
| 87.4 | 10.5 | 2.1 | 639 | 106–110 |

We claim as our invention:

1. Acetone-soluble highly reactive epoxy-containing condensates of (1) a polyepoxide possessing more than 1 vic-epoxy group, and (2) a polyfunctional aromatic amine possessing more than two active hydrogen attached to amino nitrogen said condensates having a weight per epoxide of from at least about 300 to about 3,000.

2. A condensation product as in claim 1 wherein the polyepoxide is a polyglycidyl ether of a polyhydric compound of the group consisting of polyhydric alcohols and polyhydric phenols.

3. A condensation product as in claim 1 wherein the polyfunctional amine is an aromatic polyamine.

4. A condensation product as in claim 1 which has a softening point of at least 50° C. and a weight per epoxide of at least 300.

5. A condensation product as in claim 1 wherein the polyfunctional amine is methylene dianiline.

6. A condensation product as in claim 1 wherein the polyfunctional amine is meta-phenylene diamine.

7. A condensation product as in claim 1 wherein a difunctional amine is included with the polyfunctional amine.

8. A condensation product as in claim 1 wherein the polyepoxide is a polyglycidyl ether of 2,2-bis(4-hydroxyphenyl)propane.

9. A solid acetone-soluble highly reactive epoxy-containing condensate, of (1) a glycidyl polyether of a polyhydric phenol, and (2) a mixture of an aromatic amine having 3 to 6 free active hydrogen attached to amino nitrogen and a difunctional amine, said condensate having a softening point between 50° C. and 150° C. and a WPE between 300 to 3,000.

10. A condensate as in claim 9 wherein the aromatic amine is methylene dianiline and the difunctional amine is aniline.

11. A condensate as in claim 9 wherein the aromatic amine is meta-phenylene diamine and the difunctional amine is aniline.

12. A condensate as in claim 9 wherein the aromatic amine is methylene dianiline and the difunctional amine is meta-aminophenol.

13. A process for preparing highly reactive solid acetone-soluble epoxy-containing condensates which comprises mixing and reacting a polyepoxide having more than one vic-epoxy group with a polyfunctional aromatic amine having more than two active hydrogen attached to amino nitrogen, the polyepoxide and amine being combined so that the polyepoxide is in excess of from .33 to .033 equivalents and the total functionality varies from 2 to 2.5.

14. A process as in claim 13 wherein the reaction mixture also contains an acid acting catalyst.

15. A process as in claim 13 wherein the reaction temperature varies from 60° C. to 200° C.

16. A process as in claim 13 wherein the polyepoxide is a glycidyl polyether of a polyhydric phenol and the polyfunctional amine is an aromatic amine having from 3 to 6 active hydrogen attached to amino nitrogen.

17. A process as in claim 13 wherein the polyepoxide is a glycidyl polyether of 2,2-bis(4-hydroxyphenyl)propane and the polyfunctional amine is methylene dianiline.

18. A hard insoluble infusible product obtained by heating the condensate of claim 1 with an epoxy resin curing agent.

19. A insoluble infusible product as in claim 18 wherein the curing agent is dicyandiamide.

20. A process as in claim 13 wherein water is used as a co-catalyst.

References Cited

UNITED STATES PATENTS 2,773,048   12/1956   Formo et al.

WILLIAM H. SHORT, *Primary Examiner.*

T. D. KERWIN, *Assistant Examiner.*